United States Patent [19]

Tan

[11] Patent Number: 4,813,238

[45] Date of Patent: Mar. 21, 1989

[54] ATOMIZED INSTANT COOLING PROCESS

[76] Inventor: Domingo K. L. Tan, 6028 Bitternut Dr., Alexandria, Va. 22310

[21] Appl. No.: 173,144

[22] Filed: Mar. 25, 1988

[51] Int. Cl.⁴ .............................................. F25D 17/02
[52] U.S. Cl. ......................................... 62/64; 62/121; 62/244; 62/304; 261/DIG. 4
[58] Field of Search ................. 62/62, 64, 78, 244, 62/121, 292, 304; 261/DIG. 3, DIG. 4; 422/4, 123

[56] References Cited

U.S. PATENT DOCUMENTS

| | | | |
|---|---|---|---|
| 2,199,485 | 5/1940 | DeVout | 62/121 |
| 2,248,713 | 7/1941 | Locke | 261/DIG. 4 |
| 2,352,748 | 7/1944 | Whiteley | 62/304 |
| 2,371,468 | 3/1945 | Rogers | 261/DIG. 4 |
| 4,549,406 | 10/1985 | Ebner et al. | 261/DIG. 3 |

*Primary Examiner*—Ronald C. Capossela
*Attorney, Agent, or Firm*—Eric P. Schellin

[57] ABSTRACT

Method of instantly lowering the temperature of the passenger compartment a of vehicle using atomized bursts of alcohol-water solution.

5 Claims, No Drawings

ATOMIZED INSTANT COOLING PROCESS

BACKGROUND OF THE INVENTION

Field of the Invention

During the summer months or under hot weather conditions, it is common knowledge that an automobile which is exposed to the sun and parked with closed windows can reach temperatures of about 130° F. or higher in the interior portions or passenger compartment. At these temperatures, passengers desirous of entering the vehicle must usually open all doors and windows in an attempt to lower the interior temperatures by allowing outside air to enter the compartment; however, this can be a time consuming process inasmuch as the outside air is also oftentimes very hot.

Therefore, a need exists to devise a simple method for instantly lowering interior temperatures within the passenger compartment of an automobile during hot weather to a level (usually from about 70° F. to 78° F.) that allows an occupant to comfortably enter it without having to open all of the doors and windows, in an often times futile attempt to quickly cool the automobile's interior with hot air from points exterior to the vehicle.

A further need exists for a simple method for quickly lowering temperatures within the passenger compartment of an automobile during hot weather without having to enter the vehicle and start it up preparatory to achieving cooling by turning on the air conditioner or obtaining cooling from circulating air flow during transit of the automobile with opened air vents and/or windows.

SUMMARY OF THE INVENTION

The present invention provides a simple method for quickly lowering interior temperatures within the passenger compartment of an automobile during summer months or under hot weather conditions, without the need of having to open all of the doors or windows in an attempt to lower temperatures from the 130° F. range or higher, by the influx of existing hot air, which is in circulation exterior to the vehicle.

Temperature lowering using the method of the invention is accomplished simply and swiftly and without the need of going through the uncomfort of having to enter the vehicle in order to start it up for purposes of turning on the air conditioning or achieving cooling from circulating air thru opened air vents or windows, after the vehicle is in transit.

Swift temperature cooling of the atmosphere and interior of the passenger compartment of an automobile having temperatures of 130° F. or higher due to hot weather conditions is accomplished by expelling several bursts of an atomized solution comprising water and a non-toxic aliphatic alcohol, and optionally minor amounts of an aromatic alcohol and an air freshener or fragrance.

The composition of the solution must be such that when an atomized burst of the same is expelled into a heated passenger compartment of an automobile, the heat from the atmosphere and environment therein will vaporize the atomized solution at a rate sufficient to swiftly effect a significant lowering of the interior temperature that is low enough, i.e. about 70° F. to about 78° F., to allow entry with comfort.

DETAILED DESCRIPTION OF THE INVENTION

The invention solution from which an atomized spray is obtained comprises mixtures of primarily ethyl alcohol and water; however, minor amounts of aromatic alcohols and fragrances can also be included in order to provide pleasant remnant or residual odors, after the atomized solution has been vaporized by the heat from the interior of the automobile passenger compartment.

It has been found that even though an ethyl alcohol/water mixture containing from about 50% by weight to about 20% by weight of alcohol boils at temperatures of from about 81.2° C. (178° F.) to about 86° C. (187° F.), an atomized mist of these mixtures into a relatively closed environment (automobile with one door open) at a temperature of from about 130° F. or higher will nevertheless result in swift vaporization of the mist to create a substantial or large temperature drop (around 67° F. to about 75° F.) while leaving the interior of the automobile substantially dry (without apparent droplets of moisture or water).

While not desirous of being bound by any theory which is explanatory of how the invention works, it nevertheless appears that atomized mists of the invention solution operates as a vehicle for absorption of the heat from dry air within the interior or passenger compartment of the automobile and that even though the boiling points of the aforementioned mixtures of alcohol and water ranges from about 81.2° C. (178° F.) to about 86° C. (187° F.), the temperature in said compartment, which is at about 130° F. or higher is sufficient to instantly vaporize several bursts of an atomized solution from a device, such as a well known spray bottle with an atomizer cap or an aerosalized can from which a liquid propellant such as carbon dioxide or nitrogen is employed to eject the solution.

In the preferred embodiment of the invention, mixture of about 20% by weight of alcohol and 79% by weight of water, together with a balance of fragrance and a non-toxic aromatic alcohol is filled into a bottle which is capped with an atomizer head. One door of an automobile having internal air temperatures of about 130° F. is opened and three bursts of an atomized solution is ejected into the hot atmosphere within the compartment. There is an immediate temperature drop to about 75° F., and the compartment is left with a pleasant odor and rendered sufficiently comfortable for passenger entry in route to a journey. The number of atomized bursts ejected are not critical and may range from one bursts-to as many as can be employed to cool the automobile interior without wetting it.

While the invention has been illustrated by reference to specific examples using a principal mixture of ethyl alcohol and water, it is to be understood that any non-toxic aliphatic alcohol will suffice provided that the boiling point of a solution or mixture of the same with water is capable of instant vaporization in atomized form to function as a heat absorber which will swiftly reduce the temperature within an automobile compartment from about 130° F. or higher to ambient temperatures of between about 70° F. to 78° F. while leaving the automobile's interior substantially dry.

What is claimed is:

1. A method of instantly lowering the atmospheric temperature in the passenger compartment of a vehicle by a magnitude of about 50° F. to 65° F. prior to passenger entry, comprising:
opening a door or window of said vehicle and injecting into the passenger compartment a temperature lowering atomized mist amount of a solution comprising a non-toxic aliphatic alcohol and water.

2. The method of claim 1, wherein the alcohol is ethyl alcohol.

3. The method of claim 2, wherein the amount of ethyl alcohol is from about 20% to about 50% by weight of the solution.

4. The method of claim 3, wherein a minor amount of a fragrance is included.

5. The method of claim 4, wherein a minor amount of an aromatic alcohol is included.

* * * * *